US006473095B1

(12) United States Patent
Martino et al.

(10) Patent No.: US 6,473,095 B1
(45) Date of Patent: Oct. 29, 2002

(54) HISTOGRAM METHOD FOR CHARACTERIZING VIDEO CONTENT

(75) Inventors: Jacquelyn Annette Martino, Irvington, NY (US); Nevenka Dimitrova, Yorktown Heights, NY (US); Jan Hermanus Elenbaas, New York, NY (US); Job Rutgers, Utrechl (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/116,769

(22) Filed: Jul. 16, 1998

(51) Int. Cl.[7] .............................. G06T 11/00; H04N 5/14
(52) U.S. Cl. ....................................... 345/726; 348/700
(58) Field of Search ................................. 348/700, 558; 345/723, 726; 382/168, 170, 224; 707/100–104, 10

(56) References Cited

U.S. PATENT DOCUMENTS

| 4,694,329 A | | 9/1987 | Belares-Sarabia ............ 358/22 |
| 4,823,184 A | | 4/1989 | Blmares-Sarabia .......... 358/27 |
| 5,179,449 A | | 1/1993 | Doi ............................ 358/311 |
| 5,343,251 A | | 8/1994 | Nafeh ........................ 348/571 |
| 5,635,982 A | * | 6/1997 | Zhang et al. ................ 348/231 |
| 5,805,733 A | | 9/1998 | Wang et al. ................ 382/232 |
| 5,821,945 A | * | 10/1998 | Yeo et al. ................... 345/440 |
| 5,828,809 A | * | 10/1998 | Chang et al. ................ 386/69 |
| 5,835,667 A | * | 11/1998 | Wactlar et al. ............... 386/96 |
| 5,915,250 A | * | 6/1999 | Jain et al. ................... 707/100 |
| 5,995,095 A | * | 11/1999 | Ratakonda .................. 345/328 |
| 6,182,069 B1 | * | 1/2001 | Niblack et al. ................ 707/6 |
| 2001/0003468 A1 | * | 6/2001 | Hampapar et al. .......... 348/700 |

FOREIGN PATENT DOCUMENTS

| EP | 0690413 A2 | 1/1996 | ............. G06T/7/20 |
| JP | 0629832 A | 10/1994 | |

OTHER PUBLICATIONS

R.C. Gonzalez and R.E. Woods, *Digital Image Processing*, (Addison Wesley 1992) pp. 235–247.
R.C. Gonzalez and R.E. Woods, *Digital Image Processing*, (Addison Wesley 1992) pp. 171–182.
S. Antani et al, *Pattern Recognition Methods in Image and Video Databases: Past, Present and Future*, Proceedings 7th International Workshop on Structural and Syntactic Pattern Recognition and 2nd International Workshop on Statistical Techniques in Patern Recognition (Aug. 1998) Sydney, Australia. pre–published at http://machine–vision.cse.ps-u.edu/antani/pubs.html (Jul. 9, 1998).

* cited by examiner

Primary Examiner—Victor R. Kostak
(74) Attorney, Agent, or Firm—Russell Gross

(57) ABSTRACT

In order to characterize video content, key frames are identified in that content. The key frames are collapsed into histograms. The histograms are grouped into families. The families are each represented by a family histogram. The family histograms characterize the video content. The family histograms can be used to determine program boundaries or index the video content.

10 Claims, 3 Drawing Sheets

HISTOGRAM METHOD FOR CHARACTERIZING VIDEO CONTENT

BACKGROUND OF THE INVENTION

1. Field of the Invention

The invention relates to the field of digital image processing and in particular to characterizing video content.

2. Related Art

U.S. Pat. No. 5,179,832 teaches using some types of data in the video data stream to find scene changes. Scene changes are determined by comparison of data in consecutive frames.

SUMMARY OF THE INVENTION

The object of the invention is to create a useful characterization of video content.

This object is achieved by extracting key frames, grouping the key frames into families and creating a family representation. Preferably, the family representation is in the form of a histogram.

The family representation can be used to distinguish program boundaries, index tapes, identify program material, edit video content, or search video content for instance as part of a web search engine.

DETAILED DESCRIPTION OF THE PREFERRED

Embodiments

Figure 1:
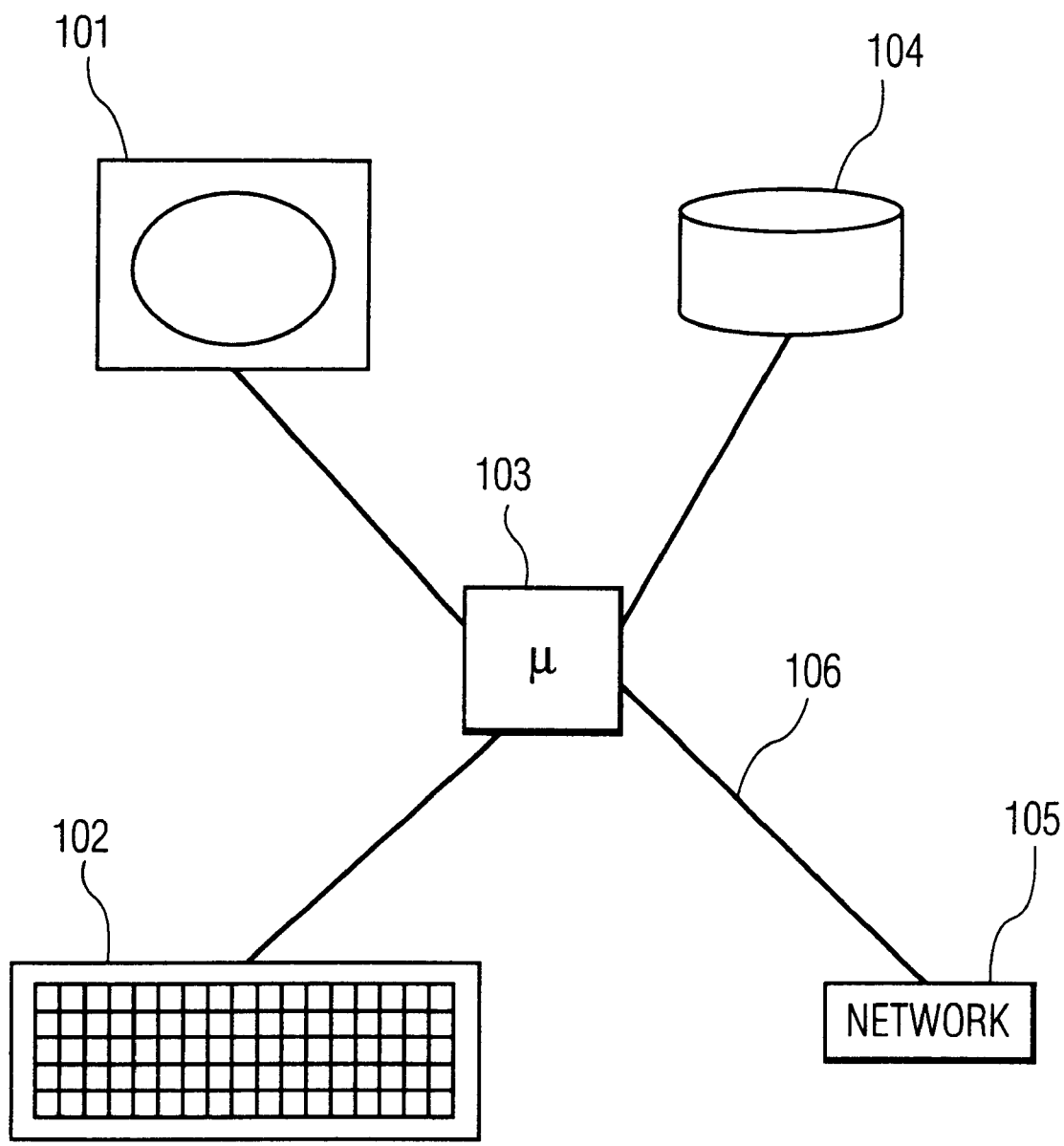
FIG. 1 is a high level view of the system in accordance with the invention.

FIG. 1 shows a system including the invention. A processor 103 is hooked to a user output device 101, a user input device 102, and a memory device 104. The memory stores digital video frame data and data abstracted from frames. The processor may optionally be connected via a communication link 106 and a network 105 to some remote device (not shown). The communication link may be wired or wireless and may lead to the remote device in some way other than through a network. The network may be the internet.

Figure 2:
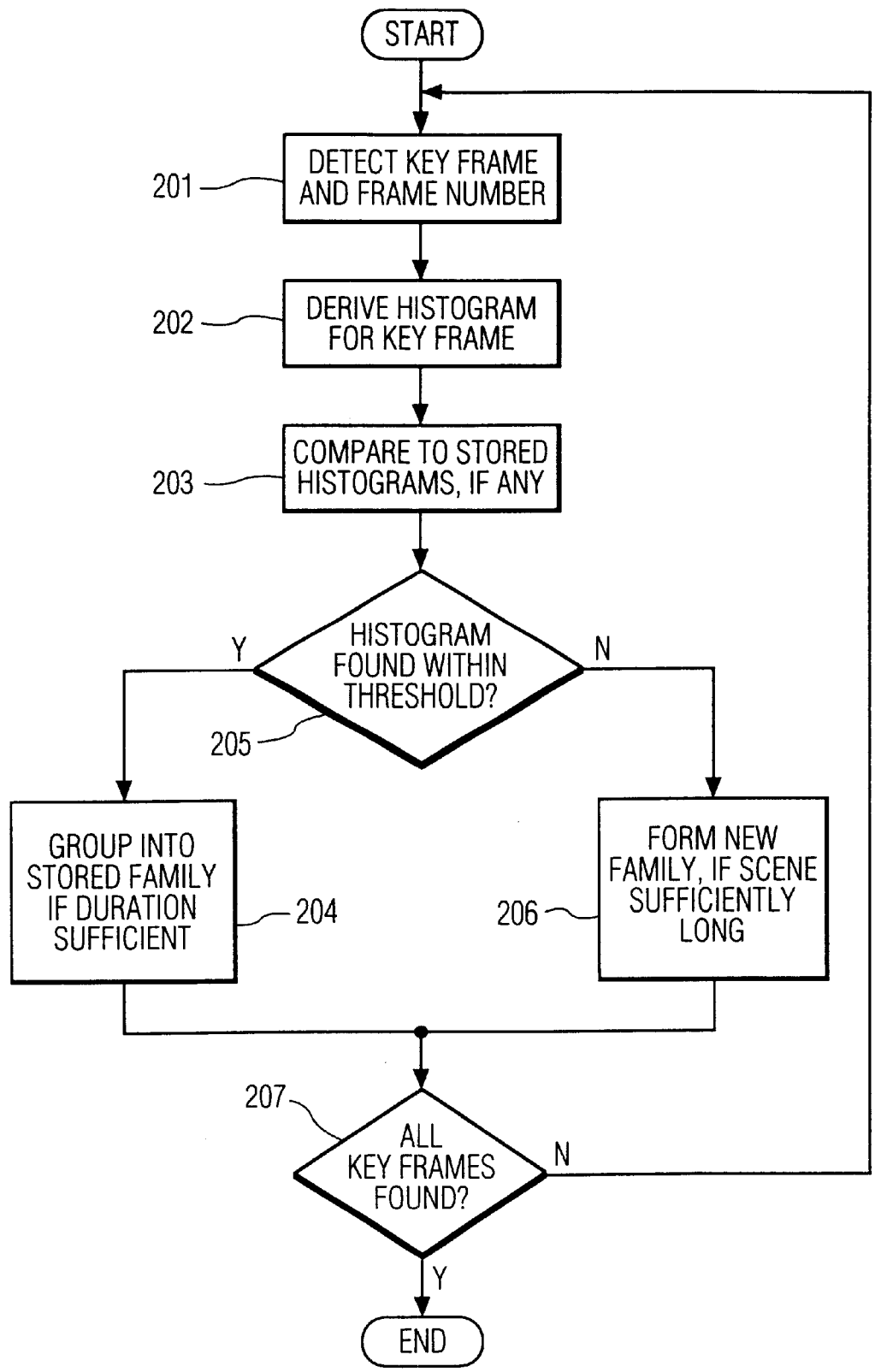
FIG. 2 is a flow chart showing operation of the invention.

FIG. 2 shows a flow chart describing operation of the preferred embodiment of invention.

In box 201, a key frame is located and its frame number stored. The frame number associated with each key frame must be retained throughout the procedure. Identification of key frames can be done in accordance with U.S. patent application Ser. Nos. 08/867,140 and 08/867,145, which are incorporated herein by reference.

In box 202, a histogram is derived for the key frame. Deriving histograms from video frames is described in R. C. Gonzalez and R. E. Woods, *Digital Image Processing*, (Addison Wesley 1992) pp. 235–247. Basically every image is described by a number of colors, called a palette. The number of colors in the palette can be chosen in accordance with the application. The histogram gives a numerical value for each color. The numerical value is the number of pixels with that color in the key frame. Each histogram must be associated with a frame number.

For speed of processing, it is preferred, for the purposes of the invention, to choose a less than exhaustive palette. Colors such as black, white, and skin tones, which are likely to appear in all frames, are preferably not chosen for the palette, or are given a low weight. In the less than exhaustive palette, each chosen color is referred to as a "bin." For instance, the following bins might be used:

| Bin name | Minimum hue degree | Maximum hue degree | Minimum percent saturation | Maximum percent saturation | Minimum percent lightness | Maximum percent lightness |
| --- | --- | --- | --- | --- | --- | --- |
| Green 01 | 67 | 146 | 7 | 100 | 10 | 95 |
| Blue 01 | 147 | 244 | 14 | 100 | 15 | 93 |
| Violet 01 | 245 | 330 | 8 | 100 | 5 | 98 |
| Red 01 | 331 | 359 | 13 | 100 | 5 | 98 |
| Red 02 | 0 | 3 | 13 | 100 | 5 | 98 |
| Orange 01 | 4 | 42 | 15 | 100 | 5 | 97 |
| Yellow 01 | 43 | 66 | 15 | 100 | 4 | 98 |

This set of bins is chosen according to a commonly used color space, but any color space might be used, e.g., HSV, YUV, RGB. More information about histogram formation is to be found in R. C. Gonzalez and R E Woods, *Digital Image Processing*, (Addison Wesley 1992) pp. 171–182. The set given above includes eight bins, but other numbers of bins might be used. Also, other definitions of the bins might be used, according to what the designer finds most effective. The different bins may be assigned different weights according to how important they are considered to be, so the weights may be considered an additional column in the above table.

After a histogram is defined for the key frame, based on the color of bins, the key frame is compared with any stored key frames at 203. This comparison is in accordance with the following formula:

$$\text{difference}(H_i, H_{i-1}) = \sum_j (w_i * v_j * |H_i(j) - H_{i-1}(j)|) < \text{Threshold} \quad (1)$$

In this formula, the variable $H_i$ represents the histogram associated with the key frame of index i. The vector value $H_i(j)$ is the numerical value of this histogram associated with bin of index j. The variable Threshold represents a value below which two histograms are to be considered similar.

The variable $v_j$ is a weight associated with the bin of index j. If all bins are considered to have the same weight, then this bin weight can be omitted from formula 1.

The variable $w_i$ represents a weight to be assigned to a key frame of index i. It should be noted that key frames associated with scenes of extremely short duration should be given low weight, as these scenes are probably not significant to the program and may even represent commercials. Thus very short scenes should probably not be considered as being different from the scenes that precede them and should not be grounds for starting a new family, per the following step.

If the short scenes are never to be used for any purpose, it may be more efficient simply to test for scene length after box 201; and, if scene length is insufficient, control could be returned to box 201, without proceeding to the rest of the flow chart.

Formula (1) is only one of many ways of calculating a distance between histograms. Other ways of calculating such distances are discussed in S. Antani et al., *Pattern Recognition Methods in Image and Video Databases: Past, Present and Future*, Proceedings 7th International Workshop on Structural and Syntactic Pattern Recognition and $2^{nd}$ International Workshop on Statistical Techniques in Pattern Recognition (August 1998) Sydney, Australia, pre-published on the internet at http://machine_vision.cse.psu.edu/~antani/pubs.html on Jul. 9, 1998.

At 205 there is a branch. If the difference calculated according to formula (1) is less than Threshold, then the key frame represented by the current histogram is to be grouped into a stored family at 204. If the difference is greater than the stored threshold, a new family is formed at 206. New families are formed at 206 or histograms grouped into current families, only if the duration of the scene associated with the current histogram is considered sufficient, e.g., more than one minute.

At 206, a new family is formed. This family is a data structure which includes a family histogram, a total duration, and pointers to the constituent histograms and frame numbers. Each family histogram is formed by a data structure with pointers to each of the constituent histograms and frame numbers;
  a family histogram, initialized to the current histogram; and
  a variable representing total duration, which is initialized to the duration of the scene represented by the current histogram.

At 204, family histograms are grouped according to the following formula:

$$H_{fam}(l) = \sum_i \left( \frac{dur_i}{total\_dur_{fam}} \cdot H_i(l) \right) \quad (2)$$

In this formula l is a variable representing the bin number;
fam is an index representing this particular family;
$H_{fam}$ is a vector representing the family histogram;
i is an index representing the scene number. This index starts at 1 for the first scene added to the family and runs through the number of scenes in the family, including the current one being added.
$dur_i$ is a variable representing the duration of scene i. This duration is obtained by subtracting the frame number corresponding to the following key frame i+1 from the frame number of the current key frame i;
$H_i(l)$ is the numerical value indicating the number of pixels in bin l for key frame number i; and
$total\_dur_{fam}$ is a variable representing the total duration of all scenes already in the family. This variable must be updated by adding the duration of the scene associated with the current histogram, prior to making the calculation of formula (2).

At 207 it is tested whether all key frames have been found. If not, control returns to box 201. If so, each family is now represented by a single histogram, which is used for comparison purposes when new key frames are detected in a stream of video content. It would be expected that most half hour programs could be represented by about 3 families of histograms, though more or less could be used depending on the programming in question. A longer show might need more. Families of key frames characterizing a program can be built on the fly in accordance with the invention. Alternatively, families of key frames might be pre-stored corresponding to existing programs that a user might want to identify.

Once families are created, they can be used for numerous purposes. One is that the families can be used to distinguish program boundaries.

Figure 3:
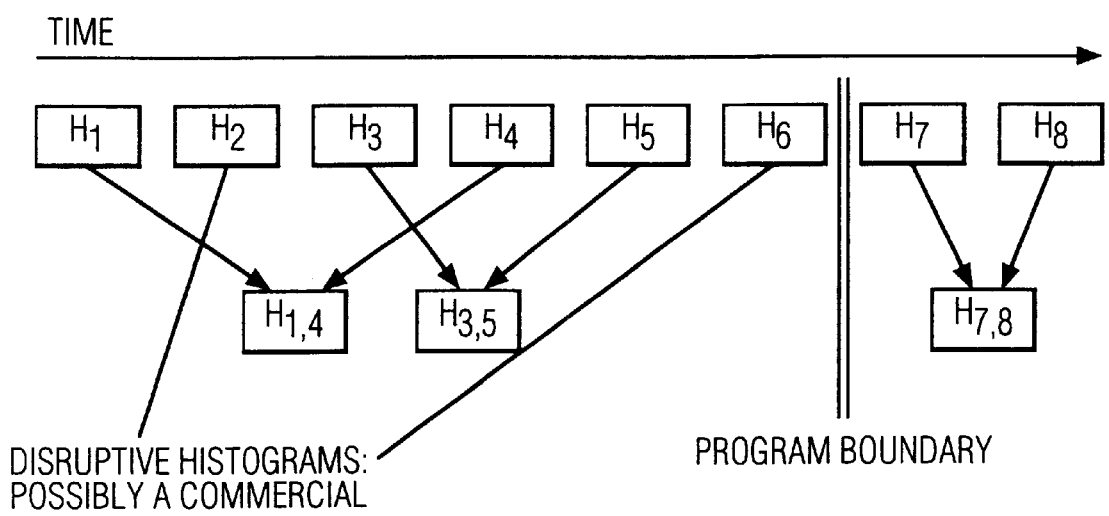
FIG. 3 shows grouping of video material into key frames, families, and programs.

FIG. 3 shows video information grouped into key frames, represented by histograms. In this example, the histograms are called $H_1$, $H_2$, $H_3$, $H_4$, $H_5$, $H_6$, $H_7$, and $H_8$. Real video information could have more or less key frames. Certain of the histograms are grouped into families. For instance, $H_1$ and $H_4$ are both in a family represented by histogram $H_{1,4}$; $H_3$ and $H_5$ are both in a family represented by histogram $H_{3,5}$; and $H_7$ and $H_8$ are both in a family represented by histogram $H_{7,8}$. The histograms $H_2$ and $H_6$ are categorized as "disruptive." In other words, the video duration associated with those key frames is so short that they are not considered useful in identifying programming. Accordingly, their weights $w_2$ and $w_6$ in equation (1) will be low AND they will not be put into families according to boxes 204 and 206 of FIG. 2. The formation of these families is in accordance with boxes 204, 205 and 206 in FIG. 2.

The indices illustrated in the figures are purely examples. More or less indices of different values could be used by those of ordinary skill in the art depending on the actual video content.

A program boundary is placed between $H_7$ and $H_6$ in accordance with box 209 of FIG. 2.

The family histograms $H_{1,4}$ and $H_{3,5}$ could then constitute a characterization of the first program. These family histograms could be stored for searching for programming on a database or on a VCR.

Another possible use of the families of histograms is to compare programs.

Boundaries of programs could be found in accordance with FIG. 3. Alternatively, program boundaries could be determined manually. An algorithm for finding program boundaries follows:

Let $F_i$ be FamilyGroup i in the list of FamilyGroups F. n is the size of the list of FamilyGroups.
$MIN(F_i)$ is the minimum keyframeNr in the FamilyGroup $F_i$.
$MAX(F_i)$ is the maximum keyframeNr in the FamilyGroup $F_i$.
Algorithm
Assumption: F is sorted on $MIN(F_i)$
FOR (i=0; i<n−1; i++)
DO
  j=i+1;
  IF (($MAX(F_i)$<($MIN(F_j)$))
  THEN
    BoundaryBegin=MAX(MIN($F_j$), BoundaryBegin)
    BoundaryEnd=MAX(MAX($F_j$), BoundaryEnd)
  ELSE
    BoundaryBegin=MAX(MIN($F_j$), BoundaryBegin)
    BoundaryEnd=MAX(MAX($F_j$), BoundaryEnd)
  ENDIF
  IF (BoundaryEnd<BoundaryBegin)
  THEN
    PRINT 'Found a BOUNDARY between BoundaryEnd and BoundaryBegin'
  ENDIF
DONE
PRINT 'BOUNDARY at n (end of video)'

After program boundaries and families are determined, let us say that program S is characterized by four family histograms $$SH=(SH_1, SH_2, SH_3, SH_4)$$

and let us say that program B is characterized by four family histograms $$BH=(BH_1, BH_2, BH_3, BH_4)$$

Then the difference between two programs can be calculated according to the following formula $$\text{Diff}(SH, BH) = \sum_i \left( \min_j D(SH_i, BH_j) \right) \quad (3)$$

Where $$D(H_i, H_j) = \sum_K |H_i(k) - H_j(k)| \quad (4)$$

and where $H_i(k)$ is the value in bin k of histogram $H_i$. Alternatively, weights could be applied to certain families if those were considered particularly important for characterizing the program, in which case the function D could be defined according to the following formula.

$$D(H_i, H_j) = \sum_i |H_i(k) * w_i - H_j(k) * w_j| \quad (5)$$

The differences between programs could be used in searching databases of video content or the world wide web. Alternatively, the differences could be used for marking programming suspected to not be what it is supposed to be, e.g., if pre-emptive programming were inserted into a video stream rather than scheduled programming. In such a case, the user might want to skip or pay particular attention to pre-emptive programming. Program comparison might even be used to identify unwanted programming for deletion from a database of video content.

In characterizing a series of programs, it may be useful to develop super-histograms for the series. In such a case, formula (2) can be used to combine scenes from several programs from the series to result in families that characterize all of the several programs. Such super-histograms could then be used to search for programs of that series in a database or stream of video content.

We claim:

1. A digital data processing method for characterizing video content, the method comprising executing the following operations in a digital processing device:
   a. extracting key frames from the video content, each respective key frame representing a respective scene in the video content;
   b. grouping at least some of the key frames into at least one family of key frames;
   c. establishing a respective family histogram for the family;
   d. embodying at least one such family histogram in a storage medium to yield a characterization of the video content, the storage medium being readable by the digital data processing device.

2. The method of claim 1
   a. further comprising the step of collapsing each respective key frame into a plurality of bins to yield a respective histogram for each key frame;
   b. wherein the grouping operation comprises grouping significant key frames based on a comparison of the respective key frames.

3. The method of claim 2 wherein the grouping operation further comprises
   a. comparing each new key frame in a series with at least one family histogram to yield a difference measurement; and
   b. if the difference measurement exceeds a predetermined threshold value determining that the new key frame does not fall within the at least one family.

4. A storage medium readable by the digital data processing device embodying a characterization of video content produced according to the method of claim 1.

5. A digital data processing device comprising the storage medium of claim 4 and a digital data processor for processing data stored on the storage medium.

6. The digital data processing device of claim 5 wherein the digital data processor is adapted to index video content based on the characterization.

7. The digital data processing device of claim 5 wherein the digital data processor is adapted to search for video content based on the characterization.

8. The digital data processing device of claim 5 wherein the digital data processor is adapted to determine program boundaries based on the video content.

9. The digital data processing device of claim 5 comprising a communication link adapted to allow browsing of the medium from a remote device.

10. The digital data processing device of claim 9 wherein the communication link comprises an internet connection.

* * * * *